US012794093B2

(12) United States Patent
Kim et al.

(10) Patent No.: US 12,794,093 B2
(45) Date of Patent: Nov. 10, 2026

(54) JELLY-ROLL ELECTRODE ASSEMBLY AND CYLINDRICAL LITHIUM SECONDARY BATTERY COMPRISING SAME

(71) Applicant: LG Energy Solution, Ltd., Seoul (KR)

(72) Inventors: Jangbae Kim, Daejeon (KR); Hyeongseo Ki, Daejeon (KR); Dohyeong Kim, Daejeon (KR); Soyeon Kim, Daejeon (KR); So Hee Kim, Daejeon (KR); Hyoung Kwon Kim, Daejeon (KR); Kyungmin Jang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/046,899

(22) Filed: Feb. 6, 2025

(65) Prior Publication Data

US 2025/0210722 A1 Jun. 26, 2025

Related U.S. Application Data

(63) Continuation of application No. 18/692,144, filed as application No. PCT/KR2022/019823 on Dec. 7, 2022.

(30) Foreign Application Priority Data

Dec. 8, 2021 (KR) ........................ 10-2021-0174846

(51) Int. Cl.

| | |
|---|---|
| ***H01M 50/595*** | (2021.01) |
| ***H01M 4/13*** | (2010.01) |
| ***H01M 10/04*** | (2006.01) |
| ***H01M 10/052*** | (2010.01) |
| ***H01M 10/0587*** | (2010.01) |

(Continued)

(52) U.S. Cl.

CPC ........... *H01M 50/595* (2021.01); *H01M 4/13* (2013.01); *H01M 10/0431* (2013.01); *H01M 10/052* (2013.01); *H01M 10/0587* (2013.01); *H01M 10/4235* (2013.01); *H01M 50/107* (2021.01);

(Continued)

(58) Field of Classification Search

CPC ............. H01M 50/538; H01M 50/586; H01M 50/531; H01M 50/595

See application file for complete search history.

(56) References Cited

U.S. PATENT DOCUMENTS

| | | | |
|---|---|---|---|
| 7,033,697 | B2 | 4/2006 | Park et al. |
| 9,048,489 | B2 | 6/2015 | Oh et al. |

(Continued)

FOREIGN PATENT DOCUMENTS

| | | | |
|---|---|---|---|
| CN | 110337752 | A | 10/2019 |
| CN | 112259806 | A | 1/2021 |

(Continued)

OTHER PUBLICATIONS

The International Search Report (PCT/ISA/210) issued in PCT/KR2022/019823, dated Apr. 3, 2023.

(Continued)

*Primary Examiner* — Robert S Carrico

(74) *Attorney, Agent, or Firm* — Lerner David LLP

(57) ABSTRACT

A jelly roll electrode assembly and a cylindrical lithium secondary battery includes a positive electrode, a negative electrode and at least one separator. The negative electrode has an end provided with a non-coated portion on opposite surfaces.

20 Claims, 4 Drawing Sheets

(51) Int. Cl.

| | |
|---|---|
| ***H01M 10/42*** | (2006.01) |
| ***H01M 50/107*** | (2021.01) |
| ***H01M 50/531*** | (2021.01) |
| ***H01M 50/536*** | (2021.01) |
| ***H01M 50/586*** | (2021.01) |

(52) U.S. Cl.

CPC ....... *H01M 50/531* (2021.01); *H01M 50/536* (2021.01); *H01M 50/586* (2021.01)

(56) References Cited

U.S. PATENT DOCUMENTS

| | | | | |
|---|---|---|---|---|
| 9,819,046 | B2 | 11/2017 | Choi et al. | |
| 2002/0004171 | A1* | 1/2002 | Kimijima | H01M 10/0565 429/246 |
| 2003/0099880 | A1* | 5/2003 | Park | H01M 50/571 429/246 |
| 2008/0280197 | A1* | 11/2008 | Machida | H01M 10/0565 429/129 |
| 2010/0190056 | A1* | 7/2010 | Turner | H01M 50/534 429/211 |
| 2012/0196165 | A1 | 8/2012 | Kim | |
| 2012/0214061 | A1 | 8/2012 | Machida | |
| 2016/0149221 | A1* | 5/2016 | Choi | H01M 50/534 429/211 |
| 2018/0254505 | A1* | 9/2018 | Kang | H01M 50/595 |
| 2021/0111465 | A1* | 4/2021 | Mizawa | H01M 50/528 |
| 2021/0265708 | A1 | 8/2021 | Lim et al. | |

FOREIGN PATENT DOCUMENTS

| | | | | |
|---|---|---|---|---|
| JP | 2002289259 | A | 10/2002 | |
| JP | 2008277207 | A | 11/2008 | |
| JP | 2009080971 | A | 4/2009 | |
| KR | 20030042578 | A | 6/2003 | |
| KR | 20090132925 | A | 12/2009 | |
| KR | 20110007785 | A * | 1/2011 | H01M 50/959 |
| KR | 101062681 | B1 | 9/2011 | |
| KR | 101062861 | B1 | 9/2011 | |
| KR | 20120088210 | A | 8/2012 | |
| KR | 20160051001 | A | 5/2016 | |
| KR | 20160051132 | A | 5/2016 | |
| KR | 2018-0025542 | A | 3/2018 | |
| KR | 101841306 | B1 | 3/2018 | |
| KR | 102097107 | B1 | 4/2020 | |
| KR | 20200050798 | A | 5/2020 | |
| WO | 2018180748 | A1 | 10/2018 | |

OTHER PUBLICATIONS

Extended European Search Report including Written Opinion for Application No. 25164183.3 dated Jul. 7, 2025. 11 pages.

* cited by examiner

[FIG. 1]
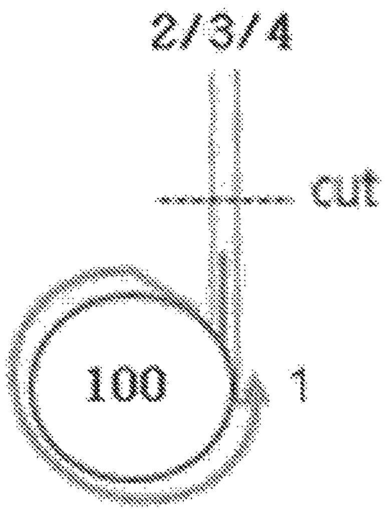
[FIG. 2]
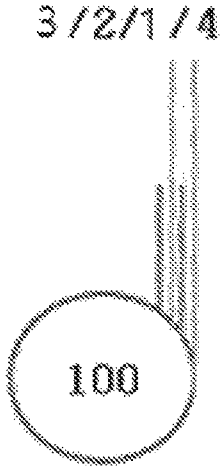

[FIG. 3]
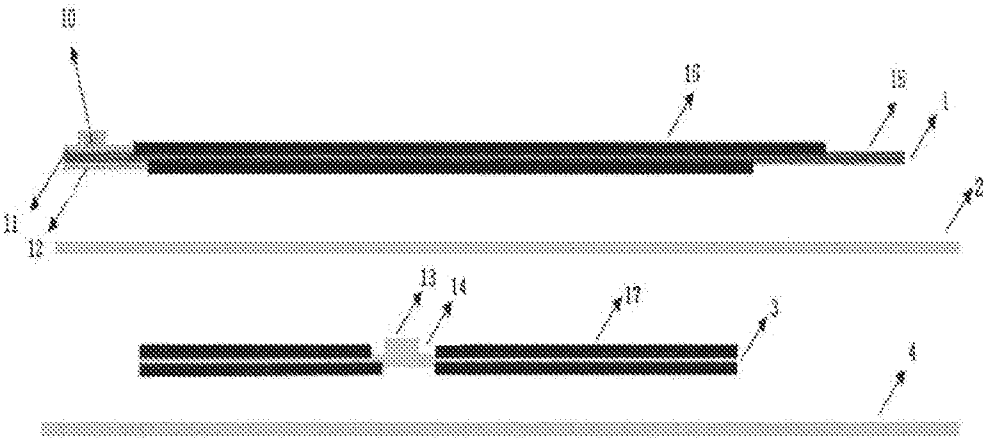
[FIG. 4]
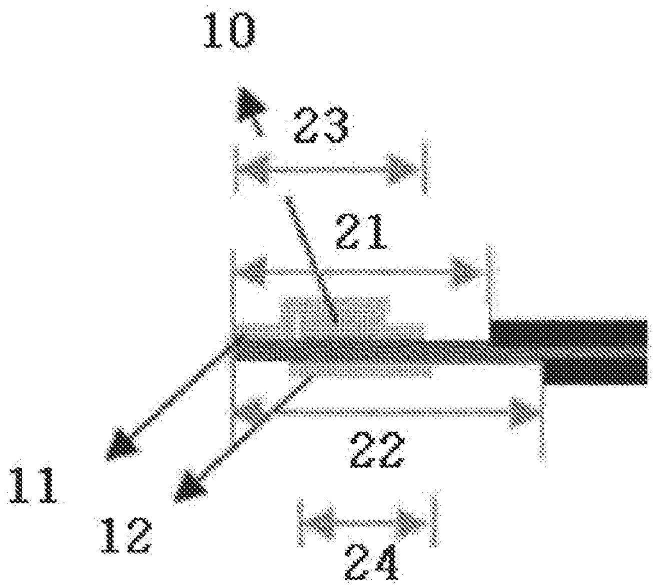

[FIG. 5]
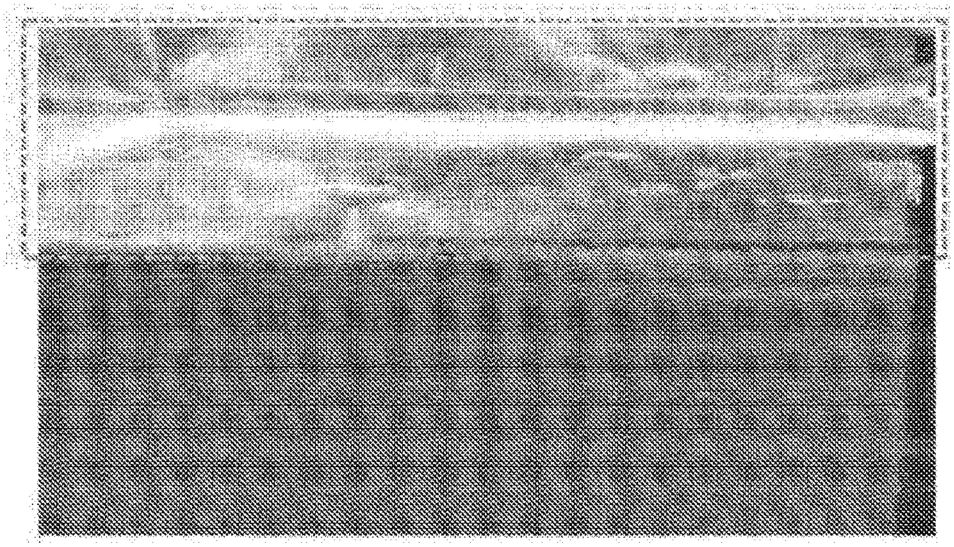
[FIG. 6]
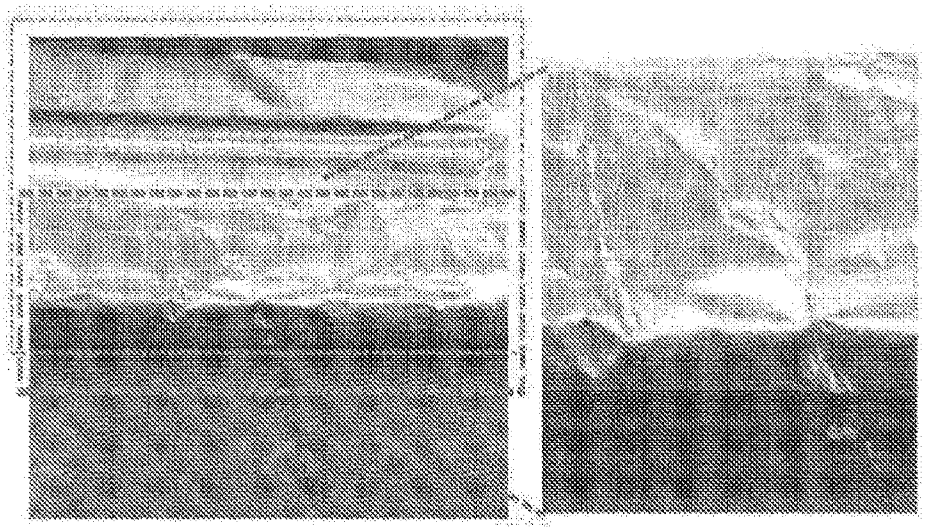

[FIG. 7]
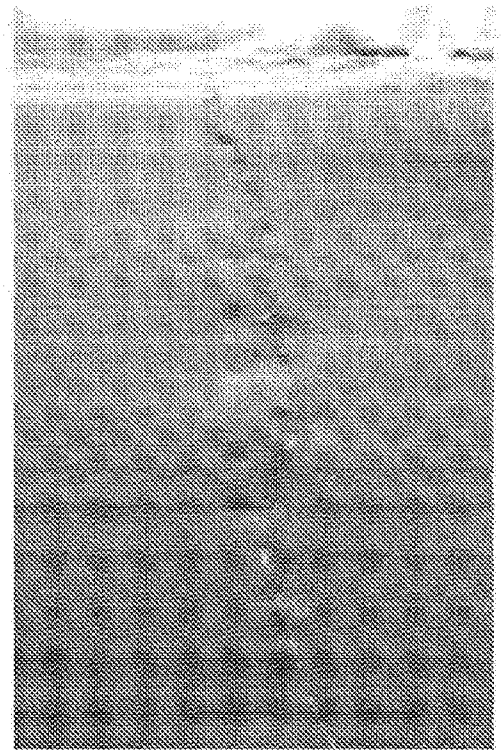

JELLY-ROLL ELECTRODE ASSEMBLY AND CYLINDRICAL LITHIUM SECONDARY BATTERY COMPRISING SAME

CROSS-REFERENCE TO RELATED APPLICATIONS

This application is a continuation of U.S. application Ser. No. 18/692,144, filed on Mar. 14, 2024, which is a national phase entry under 35 U.S.C. § 371 of International Application no. PCT/KR2022/019823, filed on Dec. 7, 2022, which claims priority to Korean Patent Application No. 10-2021-0174846, filed on Dec. 8, 2021, the disclosures of all of which are hereby incorporated by reference herein in their entireties.

TECHNICAL FIELD

The present application relates to a jelly roll electrode assembly and a cylindrical lithium secondary battery including the same.

BACKGROUND ART

A rapid increase in the use of fossil fuels has increased the need for the use of alternative energy or clean energy. Power generation and power accumulation using an electrochemical reaction have been most actively studied in the field of alternative energy or clean energy.

At present, a representative example of an electrochemical element using electrochemical energy is a secondary battery. A region in which the secondary battery is used tends to be expanded gradually.

As development of technologies and demands for mobile devices are increased, there is a rapidly increasing demand for rechargeable batteries as energy sources. Among the secondary batteries, a lithium secondary battery has been commercially available and widely used. The lithium secondary battery has high energy density, a high voltage, a prolonged cycle lifespan, and a low self-discharge rate. In addition, studies are being actively conducted on a method of manufacturing a high-density electrode having higher energy density per unit volume as an electrode for the high-capacity lithium secondary battery.

In general, the secondary battery includes a positive electrode, a negative electrode, an electrolyte, and a separator. The negative electrode includes a negative electrode active material that intercalates and de-intercalates lithium ions released from the positive electrode. A silicon-based particle having a high discharge capacity may be used as the negative electrode active material.

The positive electrode of the lithium secondary battery is typically manufactured by using a compound into which lithium is intercalated, such as $LiCoO_2$ or $LiMn_2O_4$. The negative electrode is manufactured by using a material carbon-based or Si-based into which lithium is not intercalated. The lithium ions intercalated into the positive electrode move to the negative electrode through the electrolyte during a charging process. The lithium ions move from the negative electrode back to the positive electrode during a discharging process.

The lithium secondary batteries having various shapes, such as a cylindrical shape, a pouch type, and an angular shape, are used depending on the use thereof. A cylindrical cell in the related art is configured such that a separator is disposed at an outermost side of the cylindrical cell after a winding process. In a structure in which the separator is disposed at an outer periphery, the separator surrounds the entire cell, and the cylindrical cell is electrically connected to an external battery can through a positive electrode tab and a negative electrode tab.

The cylindrical cell in the related art has a structure in which the positive electrode, the separator, the negative electrode, and the separator are wound in this order, and the separator is exposed to an outermost periphery. In contrast, Cu foil has an outermost peripheral structure in which the negative electrode, the separator, the positive electrode, and the separator are wound, and the Cu foil is exposed to an outermost periphery. The Cu foil may be in direct contact with an inner wall of the external battery can of the cylindrical cell and electrically connected to the external battery can, such that the Cu foil may be advantageously substituted for the outer negative electrode tab.

However, in case that the Cu foil is not appropriately in contact with the external battery can, there occurs a problem in that resistance increases, and the resistance varies depending on an outer diameter of a jelly roll. Unlike a structure in the related art in which a separator is disposed at an outer periphery, the Cu foil is disposed at the outermost periphery, such that the two separators are present inside the Cu foil while surrounding the positive electrode.

A thickness of the Cu foil, which is a negative electrode current collector, tends to decrease gradually. In particular, a jelly roll electrode assembly is made by attaching the tab to a non-coated portion of a core part of the negative electrode current collector and starting the winding process about the core part. In this case, the non-coated portion of the core part of the negative electrode current collector is wrinkled at the same time as the winding process. The wrinkle extends as a wrinkle of the negative electrode, which causes a problem in that the jelly roll electrode assembly is wound in a wrinkled state.

Therefore, studies have been conducted to prevent a wrinkle of the electrode of the core part in the jelly roll electrode assembly in which the Cu foil, which is the negative electrode current collector, defines the outermost periphery.

DOCUMENT OF RELATED ART (Patent Document 1) Japanese Patent Application Laid-Open No. 2009-080971

DETAILED DESCRIPTION OF THE INVENTION

Technical Problem

The present application relates to a jelly roll electrode assembly and a cylindrical lithium secondary battery including the same.

Technical Solution

An embodiment of the present specification provides a jelly roll electrode assembly including: a first separator; a positive electrode stacked on a surface of the first separator and including a positive electrode current collector; a second separator provided on a surface opposite to a surface of the positive electrode that adjoins the first separator; and a negative electrode including a negative electrode current collector provided on a surface opposite to a surface of the second separator that adjoins the positive electrode, in which the jelly roll electrode assembly has a structure wound around the negative electrode while defining a jelly roll hollow portion in a core part, in which the negative electrode current collector includes: a negative electrode coated portion onto which a negative electrode active material is applied; and negative electrode non-coated portions onto which the negative electrode active material is not applied, in which the negative electrode non-coated portions are formed at two opposite ends of the negative electrode, in which at least one of the negative electrode non-coated portions has a negative electrode tab, in which a protective tape is provided on at least one surface of the negative electrode non-coated portion of the negative electrode current collector, and in which the protective tape satisfies Expression 1 below.

$$50\% \leq a \leq 100\% \quad \text{[Equation 1]}$$

In Expression 1, a represents (a length of the protective tape attached to the negative electrode non-coated portion/an overall length of the negative electrode non-coated portion)× 100%.

Another embodiment provides a cylindrical lithium secondary battery including a battery exterior material; the jelly roll electrode assembly according to the present application provided in the battery exterior material; and an exterior cap having an electrode provided in an opening portion of the battery exterior material.

Advantageous Effects

The jelly roll electrode assembly according to the present application is the jelly roll electrode assembly having the structure wound around the negative electrode while defining the jelly roll hollow portion in the core part in order to implement the structure in which the negative electrode current collector is disposed at the outermost periphery. The negative electrode non-coated portion of the negative electrode current collector includes the protective tape that satisfies Expression 1 and is provided on at least one surface thereof. Therefore, even though the winding process around the central portion of the negative electrode current collector having a small thickness is performed, the protective tape provides rigidity to the negative electrode current collector, which makes it possible to prevent the occurrence of the wrinkle during the winding process, and thus prevent the electrode wrinkle of the entire electrode. Therefore, it is possible to provide the jelly roll electrode assembly having no wrinkle.

The jelly roll electrode assembly according to the present application is configured such that the protective tape is formed to cover 50% or more of at least one surface of the non-coated portion of the negative electrode of the negative electrode current collector and formed on one surface or two opposite surfaces of the non-coated portion. Therefore, the electrode wrinkle may be eliminated, and the lifespan and efficiency of the cylindrical lithium secondary battery including the jelly roll electrode assembly may be improved.

BRIEF DESCRIPTION OF DRAWINGS

FIG. 1 is a view illustrating a method of winding a jelly roll electrode assembly according to an embodiment of the present application.

FIG. 2 is a view illustrating a method of manufacturing the jelly roll electrode assembly having a structure in which a separator is disposed at an outermost periphery.

FIG. 3 is a side view illustrating the jelly roll electrode assembly according to the embodiment of the present application in a state made before a winding process.

FIG. 4 is a view illustrating a core part of a negative electrode according to the present application.

FIG. 5 is a view illustrating a negative electrode according to Example 1 of the present application.

FIG. 6 is a view illustrating a negative electrode according to Comparative Example 1 of the present application.

FIG. 7 is a view illustrating whether the negative electrode according to Comparative Example 1 of the present application is wrinkled.

EXPLANATION OF REFERENCE NUMERALS AND SYMBOLS

1: Negative electrode
2: Second separator
3: Positive electrode
4: First separator
10: Negative electrode tab
11: Protective tape provided on surface of first negative electrode non-coated portion
12: Protective tape provided on surface of second negative electrode non-coated portion
13: Positive electrode tab
14: Positive electrode non-coated portion
15: Negative electrode non-coated portion
16: Negative electrode active material layer
17: Positive electrode active material layer
21: Overall length of first negative electrode non-coated portion
22: Overall length of second negative electrode non-coated portion
23: Length of protective tape provided on surface of first negative electrode non-coated portion
24: Length of protective tape provided on surface of second negative electrode non-coated portion
100: Jelly roll hollow portion

BEST MODE

Prior to describing the present disclosure, some terms will be defined in advance.

Throughout the present specification, unless explicitly described to the contrary, the word “comprise/include” and variations such as “comprises/includes” or “comprising/including” will be understood to imply the inclusion of stated elements, not the exclusion of any other elements.

In the present specification, the term ‘p to q’ means a range of ‘p or more and q or less’.

In the present specification, the term “specific surface area” is measured by a BET method, and specifically, is calculated from the adsorption amount of nitrogen gas under a liquid nitrogen temperature (77K) using Belsorp-mino II of BEL Japan Co. That is, in the present application, the term “BET specific surface area” may mean a specific surface area measured by the above-mentioned measurement method.

In the present specification, the term “average particle diameter Dn” refers to a particle diameter at an n % point in the cumulative distribution of the number of particles according to a particle diameter. That is, D50 is the particle size at 50% point in the cumulative distribution of the number of particles according to the particle diameter, and D90 is the particle size at 90% point of the cumulative distribution of the number of particles according to the particle diameter, and D10 is the particle size at 10% point of the cumulative distribution of the number of particles according to the particle diameter. Meanwhile, the average particle diameter may be measured by a laser diffraction method. Specifically, powder to be measured is dispersed in a dispersion medium, and then introduced into a commercially available laser diffraction particle size measurement device (for example, Microtrac S3500) to calculate particle size distribution by measuring diffraction pattern difference according to particle size when particles are passed through a laser beam.

In the present specification, a configuration in which a polymer includes any monomer as a monomer unit means that the monomer is involved in a polymerization reaction and included as a repeating unit in the polymer. In the present specification, a configuration in which a polymer includes a monomer is interpreted in the same way as a configuration in which a polymer includes a monomer as a monomer unit.

In the present specification, the term 'polymer' is understood as being used as a wide meaning including a copolymer unless the 'polymer' is clearly stated as a 'homopolymer'.

In the present specification, the term "weight average molecular weight (Mw)" and the term "number average molecular weight (Mn)" refer to polystyrene conversion molecular weights measured by gel permeation chromatography (GPC) by using monodisperse polystyrene polymer (standard sample) with various degrees of polymerization, which is commercially available as polymer for measuring the molecular weight, as a standard material. In the present specification, unless otherwise particularly specified, the molecular weight refers to the weight average molecular weight.

Hereinafter, the present invention will be described in detail with reference to the drawings so that those with ordinary skill in the art to which the present invention pertains may easily carry out the present invention. However, the present invention may be implemented in various different forms and is not limited to the following description.

An embodiment of the present specification provides a jelly roll electrode assembly including: a first separator; a positive electrode stacked on one side surface of the first separator and including a positive electrode current collector; a second separator provided on a surface opposite to a surface of the positive electrode that adjoins the first separator; and a negative electrode including a negative electrode current collector provided on a surface opposite to a surface of the second separator that adjoins the positive electrode, in which the jelly roll electrode assembly has a structure wound around the negative electrode while defining a jelly roll hollow portion in a core part, in which the negative electrode current collector includes: a negative electrode coated portion onto which a negative electrode active material is applied; and negative electrode non-coated portions onto which the negative electrode active material is not applied, in which the negative electrode non-coated portions are formed at two opposite ends of the negative electrode, in which at least one of the negative electrode non-coated portions disposed at the two opposite ends has a negative electrode tab, in which a protective tape is provided on at least one surface of the negative electrode non-coated portion of the negative electrode current collector, and in which the protective tape satisfies Expression 1 below.

$$50\% \leq a \leq 100\% \qquad \text{[Expression 1]}$$

In Expression 1, a represents (a length of the protective tape attached to the negative electrode non-coated portion/an overall length of the negative electrode non-coated portion)×100%.

The jelly roll electrode assembly according to the present application is the jelly roll electrode assembly having the structure wound around the negative electrode while defining the jelly roll hollow portion at the central portion in order to implement the structure in which the negative electrode current collector is disposed at the outermost periphery. The negative electrode non-coated portion of the negative electrode current collector includes the protective tape that satisfies Expression 1 and is provided on at least one surface thereof. Therefore, even though the winding process around the central portion of the negative electrode current collector having a small thickness is performed, the protective tape provides rigidity to the negative electrode current collector, which makes it possible to prevent the occurrence of the wrinkle during the winding process, and thus prevent the electrode wrinkle of the entire electrode. Therefore, it is possible to provide the jelly roll electrode assembly having no wrinkle.

The embodiment of the present application may provide an electrode sheet including a first separator, a positive electrode stacked on one side surface of the first separator and including a positive electrode current collector, a second separator stacked on one side surface of the positive electrode, and a negative electrode including a negative electrode current collector disposed on the second separator.

That is, the jelly roll electrode assembly may include: a first separator; a positive electrode stacked on one side surface of the first separator and including a positive electrode current collector; a second separator provided on a surface opposite to a surface of the positive electrode that adjoins the first separator; and a negative electrode including a negative electrode current collector provided on a surface opposite to a surface of the second separator that adjoins the positive electrode, in which the jelly roll electrode assembly has a structure wound around the negative electrode while defining a jelly roll hollow portion in a core part. The jelly roll electrode assembly may be expressed as a jelly roll electrode assembly having a structure made by winding the electrode sheet.

In the embodiment of the present application, a method of manufacturing the jelly roll electrode assembly includes a step of preparing and stacking the positive electrode, the negative electrode, the first separator, and the second separator.

In the step, the first separator, the positive electrode, the second separator, and the negative electrode are sequentially stacked and wound around the negative electrode while defining the jelly roll hollow portion in the core part. The above-mentioned stacking and winding method may form the jelly roll electrode assembly having a structure in which the negative electrode current collector is disposed at an outermost periphery.

FIG. 1 is a view illustrating a method of winding an electrode sheet according to an embodiment of the present application in the form of a jelly roll electrode assembly. Specifically, it can be ascertained that a structure is made by stacking a first separator 4, a positive electrode 3 stacked on one side surface of the first separator and including a positive electrode current collector, a second separator 2 stacked on one side surface of the positive electrode 3, and a negative electrode 1 including a negative electrode current collector disposed on the second separator 2. Further, it can be ascertained that the structure is wound around the negative electrode 1 while defining a jelly roll hollow portion 100 at a central portion thereof. In addition, as can be seen in FIG. 1, it can be ascertained that only the negative electrode 1 including the negative electrode current collector is wound once more, such that a jelly roll electrode assembly is formed, in which a negative electrode current collector is disposed at an outermost periphery.

FIG. 2 illustrates a structure in the related art in which a separator is disposed at an outermost periphery. The structure includes the positive electrode 3, the second separator 2, the negative electrode 1, and the first separator 4 and is wound around the positive electrode 3 while defining the jelly roll hollow portion 100 at the central portion thereof. As a result, the jelly roll electrode assembly manufactured from the above-mentioned configuration may have the structure in which the first separator 4 is disposed at the outermost periphery.

In the embodiment of the present application, the positive electrode may include: a positive electrode current collector; and a positive electrode active material layer formed on one surface or two opposite surfaces of the positive electrode current collector and including a positive electrode active material.

In the embodiment of the present application, the positive electrode current collector includes: a positive electrode coated portion onto which the positive electrode active material is applied; and a positive electrode non-coated portion onto which the positive electrode active material is not applied. The jelly roll electrode assembly includes a positive electrode tab disposed on the positive electrode non-coated portion.

In the embodiment of the present application, the positive electrode active material layer may be formed on the coated portion of the positive electrode current collector. A surface on which the positive electrode active material layer is not provided may be expressed as the positive electrode non-coated portion.

Specifically, as can be seen in FIG. 3, it can be ascertained that the positive electrode 3 is provided between the first separator 4 and the second separator 2, and the positive electrode 3 includes a non-coated portion 14 onto which a positive electrode active material layer 17 is not applied. Further, it can be ascertained that a positive electrode tab 13 is provided on the non-coated portion.

In the positive electrode, the positive electrode current collector is not particularly limited as long as the positive electrode current collector has conductivity without causing a chemical change in the battery. For example, the positive electrode current collector may be made of stainless steel, aluminum, nickel, titanium, baked carbon, or aluminum or made of stainless steel having a surface treated with carbon, nickel, titanium, silver, or the like. In addition, the positive electrode current collector may typically have a thickness of 3 to 500 μm. Adhesion of the positive electrode active material may be increased by forming fine concave-convex portions on the surface of the current collector. For example, the positive electrode current collector may be made of various materials such as films, sheets, foil, nets, porous members, foam members, and non-woven fabrics.

The positive electrode active material may be a positive electrode active material used typically. Specifically, examples of the positive electrode active material may include: a layered compound such as lithium cobalt oxide ($LiCoO_2$) or lithium nickel oxide ($LiNiO_2$) or a compound substituted with one or more transition metals; lithium iron oxide such as $LiFe_3O_4$; lithium manganese oxide such as a material represented by a chemical formula $Li_{1+c1}Mn_{2-c1}O_4$ ($0 \leq c1 \leq 0.33$), $LiMnO_3$, $LiMn_2O_3$, or $LiMnO_2$; lithium copper oxide ($Li_2CuO_2$); vanadium oxide such as $LiV_3O_8$, $V_2O_5$, or $Cu_2V_2O_7$; Ni-site-type lithium nickel oxide represented by a chemical formula $LiNi_{1-c2}M_{c2}O_2$ (here, M is at least one selected from the group consisting of Co, Mn, Al, Cu, Fe, Mg, B, and Ga, and $0.01 \leq c2 \leq 30.3$ is satisfied); lithium manganese composite oxide represented by a chemical formula $LiMn_{2-c3}Mc_3O_2$ (here, M is at least one selected from the group consisting of Co, Ni, Fe, Cr, Zn, and Ta, and $0.01 \leq c3 \leq 0.1$ is satisfied) or $Li_2Mn_3MO_8$ (here, M is at least one selected from the group consisting of Fe, Co, Ni, Cu, and Zn); $LiMn_2O_4$ in which some Li ions in a chemical formula have been substituted with alkaline earth metal ions; and the like, but the present invention is not limited thereto. The positive electrode may be made of Li metal.

The positive electrode active material layer may include a positive electrode conductive material and a positive electrode binder in addition to the above-mentioned positive electrode active material.

In this case, the positive electrode conductive material is used to impart conductivity to the electrode, and any conductive material, which has electron conductivity without causing a chemical change in the battery, may be used without particular limitation. Specific examples of the positive electrode conductive material may include: graphite such as natural graphite or artificial graphite; a carbon-based material such as carbon black, acetylene black, Ketjen black, channel black, furnace black, lamp black, thermal black, or carbon fiber; metal powder or metal fiber containing copper, nickel, aluminum, or silver; a conductive whisker such as zinc oxide or potassium titanate; conductive metal oxide such as titanium oxide; and a conductive polymer such as a polyphenylene derivative, which may be used alone or in combination of two or more thereof.

In addition, the positive electrode binder serves to improve cohesion between positive electrode active material particles and adhesion between the positive electrode active material and the positive electrode current collector. Specific examples of the positive electrode binder may include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluororubber, and various copolymers thereof, which may be used alone or in combination of two or more thereof.

In the embodiment of the present application, the positive electrode current collector may include a positive electrode non-coated portion, and a positive electrode tab formed on the positive electrode non-coated portion. The jelly roll electrode assembly according to the present application may include one positive electrode tab.

In this case, the positive electrode non-coated portion may be formed at the central portion of the positive electrode.

In the embodiment of the present application, the negative electrode may include a negative electrode current collector, and a negative electrode active material layer. The negative electrode current collector may include a negative electrode coated portion onto which a negative electrode active material is applied, and a negative electrode non-coated portion onto which the negative electrode active material is not applied.

Specifically, as can be seen in FIG. 3, it can be ascertained that the negative electrode 1 is provided on the second separator 2, and the negative electrode 1 includes non-coated portions 15 provided at two opposite ends of the negative electrode onto which a negative electrode active material layer 16 is not applied. Further, it can be ascertained that at least one of the negative electrode non-coated portions disposed at the two opposite ends of the negative electrode has a negative electrode tab 10.

The jelly roll electrode assembly according to the present application includes the negative electrode non-coated portions provided at the two opposite ends of the negative electrode, and at least one of the negative electrode non-coated portions provided at the two opposite ends includes the negative electrode tab. Specifically, one negative electrode non-coated portion of the negative electrode non-coated portions, which is disposed adjacent to a winding core part, may include the negative electrode tab.

In the embodiment of the present application, the negative electrode active material layer may include a negative electrode active material include one or more materials selected from a group consisting of silicon-based materials and carbon-based materials.

In addition, in the embodiment of the present application, the negative electrode active material layer may include a negative electrode conductive material and a negative electrode binder.

In the embodiment of the present application, materials used in the art may be used for the negative electrode active material, the negative electrode conductive material, and the negative electrode binder without limitation.

In the embodiment of the present application, the negative electrode current collector is not particularly limited as long as the negative electrode current collector has conductivity without causing a chemical change in the battery. For example, the current collector may be made of copper, stainless steel, aluminum, nickel, titanium, baked carbon, or aluminum or made of stainless steel having a surface treated with carbon, nickel, titanium, silver, or the like. Specifically, the current collector may be made of transition metal such as copper or nickel that appropriately absorbs carbon. A thickness of the current collector may be 6 μm to 20 μm, but the thickness of the current collector is not limited thereto.

The negative electrode binder may include at least one selected from the group consisting of a polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluoro-rubber, polyacrylic acid, and materials in which hydrogens thereof have been substituted with Li, Na, Ca, or the like, and also include various copolymers thereof.

The negative electrode conductive material is not particularly limited as long as the negative electrode conductive material has conductivity without causing a chemical change in the battery. For example, as the conductive material, there may be used: graphite such as natural graphite or artificial graphite; carbon black such as acetylene black, Ketjen black, channel black, furnace black, lamp black, or thermal black; a conductive fiber such as carbon fiber or metal fiber; a conductive tube such as a carbon nanotube; metal powder such as fluorocarbon powder, aluminum powder, or nickel powder; a conductive whisker such as zinc oxide or potassium titanate; conductive metal oxide such as titanium oxide; or a conductive material such as a polyphenylene derivative.

In the embodiment of the present application, the first and second separators may be used without particular limitation as long as the first and second separators separate the negative electrode and the positive electrode, provide movement passages for lithium ions, and are typically used as the separators in the secondary battery. In particular, a separator, which exhibits low resistance to the migration of electrolyte ions and has an excellent electrolyte impregnation ability, may be used. Specifically, there may be used a porous polymer film, for example, a porous polymer film made of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof. In addition, there may be used a typical porous non-woven fabric, for example, a non-woven fabric made of high-melting-point glass fiber, polyethylene terephthalate fiber, or the like. In addition, there may be used a coated separator including a ceramic component or a polymer material to ensure heat resistance or mechanical strength. Optionally, the separator may have a single-layer or multi-layer structure.

The embodiment of the present application provides the jelly roll electrode assembly, in which the negative electrode current collector includes the negative electrode coated portion onto which the negative electrode active material is applied, and the negative electrode non-coated portion onto which the negative electrode active material is not applied, the negative electrode non-coated portion is formed at the two opposite ends of the negative electrode, one of the negative electrode non-coated portions provided at the two opposite ends has the negative electrode tab, at least one surface of the negative electrode non-coated portion of the negative electrode current collector includes a protective tape, and the protective tape satisfies Expression 1 below.

$$50\% \leq a \leq 100\% \quad \text{[Expression 1]}$$

In Expression 1, a represents Length of protective tape attached to negative electrode non-coated portion/Overall length of negative electrode non-coated portion x 100%.

In the embodiment of the present application, the negative electrode non-coated portions may be formed at the two opposite ends of the negative electrode, and one of the negative electrode non-coated portions may be formed in a jelly roll hollow portion. Specifically, the negative electrode non-coated portion corresponds to a position 100 in FIG. 1. As can be seen in FIG. 3, the negative electrode non-coated portion may mean a portion of an end of the negative electrode at which the winding is started.

The embodiment of the present application provides the jelly roll electrode assembly, in which the negative electrode current collector includes the negative electrode coated portion onto which the negative electrode active material is applied, and the negative electrode non-coated portion onto which the negative electrode active material is not applied, the negative electrode non-coated portion is formed at the two opposite ends of the negative electrode, one of the negative electrode non-coated portions provided at the two opposite ends has the negative electrode tab, at least one surface of the negative electrode non-coated portion of the negative electrode current collector includes the protective tape, and the protective tape satisfies Expression 1 above.

The embodiment of the present application provides the jelly roll electrode assembly, in which the negative electrode current collector includes the negative electrode coated portion onto which the negative electrode active material is applied, and the negative electrode non-coated portion onto which the negative electrode active material is not applied, the negative electrode non-coated portion is formed at the two opposite ends of the negative electrode, one of the negative electrode non-coated portions provided at the two opposite ends has the negative electrode tab, the negative electrode tab is positioned at one end of the two opposite ends of the negative electrode non-coated portion that is positioned in the jelly roll hollow portion of the negative electrode, at least one surface of the negative electrode non-coated portion of the negative electrode current collector includes the protective tape, and the protective tape satisfies Expression 1 above.

The embodiment of the present application provides the jelly roll electrode assembly, in which at least one surface of the negative electrode non-coated portion of the negative electrode current collector includes the protective tape, and the protective tape satisfies Expression 1 above.

Another embodiment provides the jelly roll electrode assembly, in which the negative electrode non-coated portion of the negative electrode current collector includes the protective tape provided on one surface thereof, and the protective tape satisfies Expression 1 above.

Still another embodiment provides the jelly roll electrode assembly, in which the negative electrode non-coated portion of the negative electrode current collector includes the protective tapes provided on two opposite surfaces thereof, and the protective tape satisfies Expression 1 above.

The jelly roll electrode assembly according to the present application includes the protective tape provided on at least one surface of the negative electrode non-coated portion of the negative electrode current collector, and the protective tape satisfies Expression 1 above. Therefore, even though a process of winding the negative electrode current collector having a small thickness around the central portion is performed, the protective tape may provide rigidity to the negative electrode current collector, thereby preventing the occurrence of a wrinkle during the winding process. Therefore, it is possible to prevent the electrode wrinkle from the entire electrode, which makes it possible to provide the jelly roll electrode assembly that has no wrinkle.

That is, the main object of the present invention is to prevent the occurrence of an electrode wrinkle in the related art by attaching the protective tape, which satisfies the length, to the surface of at least one of the negative electrode non-coated portions of the jelly roll electrode assembly according to the present application.

The embodiment of the present application provides the jelly roll electrode assembly, in which the negative electrode non-coated portion includes a surface of a first negative electrode non-coated portion having the negative electrode tab; and a surface of a second negative electrode non-coated portion opposite to the surface of the first negative electrode non-coated portion, the protective tapes are provided on the surface of the first negative electrode non-coated portion and the surface of the second negative electrode non-coated portion, and the protective tape satisfies Expressions 2 and 3 below.

$$25\% \leq a1 \leq 100\% \qquad \text{[Expression 2]}$$

$$25\% \leq b1 \leq 100\% \qquad \text{[Expression 3]}$$

In Expressions 2 and 3, a1 represents (Length of protective tape attached to first negative electrode non-coated portion/Overall length of first negative electrode non-coated portion)×100%, b1 represents (Length of protective tape attached to second negative electrode non-coated portion/Overall length of second negative electrode non-coated portion)×100%, and at least one of a1 and b1 is 50% or more.

Specifically, the above-mentioned contents may be ascertained in FIG. 4. FIG. 4 is a view illustrating the core part of the negative electrode according to the present application. Specifically, the negative electrode tab 10 is provided on the negative electrode non-coated portion included in the core part provided at one of the two opposite ends of the negative electrode. A length 23 of the protective tape attached to the first negative electrode non-coated portion and an overall length 21 of the first negative electrode non-coated portion may be identified. A length 24 of the protective tape attached to the second negative electrode non-coated portion and an overall length 22 of the second negative electrode non-coated portion may be identified.

In the embodiment of the present application, Expression 2 may satisfy a range of 25%≤a1≤100%, a range of 50%≤a1≤100%, a range of 70%≤a1≤100%.

In the embodiment of the present application, the protective tape attached to the first negative electrode non-coated portion may be structured to cover the negative electrode tab. The protective tape may fix the negative electrode tab and prevent the non-coated portion of the negative electrode current collector from being wrinkled during the winding process.

In the embodiment of the present application, Expression 3 may satisfy a range of 25%≤b1≤100%, a range of 50%≤b1≤100%, a range of 70%≤b1≤100%.

In the embodiment of the present application, in case that the protective tape is provided on the first negative electrode non-coated portion of the negative electrode non-coated portions, which has the negative electrode tab, and the protective tape, which satisfies the above-mentioned range, is provided on the second negative electrode non-coated portion opposite to the first negative electrode non-coated portion, it is possible to greatly reduce a rate of occurrence of core wrinkle in comparison with a case in which the protective tape is provided on the single non-coated portion.

That is, it is possible to prevent the occurrence of an electrode wrinkle in the related art by attaching the protective tape, which satisfies the length, to the surface of one of the negative electrode non-coated portions of the jelly roll electrode assembly. In particular, in case that the protective tapes are provided on both the first negative electrode non-coated portion and the second negative electrode non-coated portion of the negative electrode non-coated portions, it is possible to obtain the excellent effect of preventing a wrinkle and collapse of the core part because the jelly-roll-type core part has rigidity.

The embodiment of the present application provides the jelly roll electrode assembly, in which a1 is 100%, and b1 is 100%.

In the present application, the configuration in which a1 is 100% and b1 is 100% may mean that the entire two opposite surfaces of the negative electrode non-coated portion having the negative electrode tab are covered by the protective tape.

The embodiment of the present application provides the jelly roll electrode assembly including one positive electrode tab and one negative electrode tab.

As can be seen in FIG. 3, it can be ascertained that the negative electrode tab of the jelly roll electrode assembly according to the present invention is positioned at one end of the two opposite ends of the negative electrode, which is positioned on the core part of the negative electrode, and the positive electrode tab is formed at the central portion of the positive electrode instead of the outer periphery of the positive electrode. Further, it can be ascertained that the jelly roll electrode assembly includes one positive electrode tab and one negative electrode tab.

In case that the jelly roll electrode assembly includes one positive electrode tab and one negative electrode tab as described above, resistance may increase in comparison with a case in which the jelly roll electrode assembly includes two or more positive electrode tabs and two or more negative electrode tabs. However, because the jelly roll electrode assembly includes one positive electrode tab and one negative electrode tab, a region of the non-coated portion may be reduced, and the positive electrode active material and the negative electrode active material may be further included, which makes it possible to greatly increase the capacity.

That is, the jelly roll electrode assembly according to the present invention includes one positive electrode tab and one negative electrode tab, such that the jelly roll electrode assembly is used for the high-capacity purpose instead of the high output purpose. Therefore, it is possible to identify a difference in purpose depending on the number of positive electrode tabs and the number of negative electrode tabs.

The embodiment of the present application provides the jelly roll electrode assembly including: positive electrode active material layers provided on two opposite surfaces of the positive electrode coated portion of the positive electrode current collector; and negative electrode active material layers provided on two opposite surfaces of the negative electrode coated portion of the negative electrode current collector.

In case that the active material layers are provided on both the two opposite surfaces as described above, a larger amount of active materials may be included, thereby maximizing the capacity.

The embodiment of the present application provides the jelly roll electrode assembly having a structure in which the negative electrode current collector is disposed at the outermost periphery.

The method of manufacturing the jelly roll electrode assembly having the structure in which the negative electrode current collector is disposed at the outermost periphery may be identified in FIG. 1. As can be seen in FIG. 1, the structure is wound around the negative electrode 1 while defining the jelly roll hollow portion 100 at the central portion. Only the negative electrode current collector included in the negative electrode 1 is finally wound once more around the outer periphery of the jelly roll electrode assembly, which makes it possible to define the structure in which the negative electrode current collector is exposed at the outermost periphery.

That is, the structure in which the negative electrode current collector is disposed at the outermost periphery is a structure manufactured such that the negative electrode current collector is exposed at the outermost periphery by changing the order of winding the positive electrode and the negative electrode. The structure enables the negative electrode current collector to be in direct contact with an inner wall of a battery exterior material to be described below, such that electrical connection with the can is possible without an outer negative electrode tab. That is, the jelly roll electrode assembly according to the present invention includes one positive electrode tab and one negative electrode tab as described above, such that the high-capacity battery may be implemented, and the above-mentioned feature may be implemented because the negative electrode current collector is provided at the outermost periphery.

The embodiment of the present application provides the jelly roll electrode assembly, in which the protective tape is made of any one selected from a group consisting of polyethylene terephthalate (PET), polypropylene (PP), polyester, polycarbonate (PC), polyimide (PI), polyethylene naphthalate (PEN), polyether ether ketone (PEEK), polyarylate (PAR), polycylic olefin (PCO), polynorbornene, polyethersulphone (PES), and cycloolefin polymer (COP).

The protective tape may fix the negative electrode tab. Any protective tape, which has rigidity to the extent that the protective tape may prevent the negative electrode non-coated portion from being folded during the winding process, may be used without limitation. In particular, the protective tape may be made of PET.

The embodiment of the present application may provide the jelly roll electrode assembly, in which a thickness of the protective tape is 10 μm or more and 100 μm or less.

The embodiment of the present application provides a cylindrical lithium secondary battery including a battery exterior material; the jelly roll electrode assembly according to the present application provided in the battery exterior material; and an exterior cap having an electrode provided in an opening portion of the battery exterior material.

The contents related to the jelly roll electrode assembly are identical to the above-mentioned contents.

In the embodiment of the present application, the battery exterior material may include the electrolyte therein.

The electrolyte may include, but not limited to, an organic liquid electrolyte, an inorganic liquid electrolyte, a solid polymer electrolyte, a gel-type polymer electrolyte, a solid inorganic electrolyte, and a fused-type inorganic electrolyte, which may be used to manufacture the lithium secondary battery.

Specifically, the electrolyte may include a nonaqueous organic solvent and a metal salt.

As the nonaqueous organic solvent, there may be used an aprotic organic solvent, for example, N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethyl sulfoxide, 1,3-dioxolan, formamide, dimethylformamide, dioxolan, acetonitrile, nitromethane, methyl formate, methyl acetate, phosphoric acid triester, trimethoxymethane, dioxolan derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

In particular, ethylene carbonate and propylene carbonate, which are cyclic carbonates among the carbonate-based organic solvents, are organic solvents having high viscosity and high dielectric constant, and dissociate lithium salts in an electrolyte well, and may preferably be used. In case that such cyclic carbonate and a linear carbonate with low viscosity and low dielectric constant such as dimethyl carbonate and diethyl carbonate are mixed in an appropriate ratio and used, an electrolyte having high electroconductivity may be prepared and may more preferably be used.

The metal salt may use a lithium salt, and the lithium salt is a material that may be easily dissolved in the nonaqueous electrolyte. For example, as an anion of the lithium salt, there may be used one or more selected from a group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte, one or more kinds of additives, for example, a haloalkylene carbonate-based material such as difluoroethylene carbonate, pyridine, triethylphosphite, triethanolamine, cyclic ether, ethylenediamine, n-glyme, hexaphosphoric acid triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxyethanol or aluminum trichloride, may be further included in addition to the constituent components of the electrolyte to improve life characteristics of a battery, to restrain the decrease of battery capacity, and to improve battery discharge capacity.

The jelly roll electrode assembly according to the present invention may be included in a cylindrical battery. The cylindrical battery may mean that the battery including the assembly including the positive electrode, the negative electrode, the separator, and the electrolyte has a cylindrical shape. In particular, the cylindrical battery may include a cylindrical can, a battery assembly provided in the cylindrical can, and a top cap.

MODE FOR INVENTION

Hereinafter, examples are provided to assist in understanding the present invention, but the examples are provided only to exemplify the present invention. It is apparent to those skilled in the art that various modifications and alterations may be made within the technical spirit of the present invention, and these modifications and alterations belong to the appended claims.

Example 1

According to the method illustrated in FIG. 3, a jelly roll electrode assembly was formed by stacking a first separator, a positive electrode, a second separator, and a negative electrode, providing a negative electrode tab at a winding center portion of a non-coated portion of a negative electrode current collector, attaching a protective tape, which satisfied a condition in which a was 100%, specifically, a1 was 100% and b1 was 100%, to two opposite surfaces of the non-coated portion of the negative electrode current collector having the negative electrode tab, and winding the resulting structure.

Example 2

A jelly roll electrode assembly was formed by the same method as in Example 1, except that in Example 1, a protective tape, which satisfied a condition in which a was 100%, specifically, a1 was 100%, was attached to one surface of a non-coated portion of a negative electrode current collector having a negative electrode tab.

Example 3

A jelly roll electrode assembly was formed by the same method as in Example 1, except that in Example 1, a protective tape, which satisfied a condition in which a was 80%, specifically, a1 was 80% and b1 was 30%, was attached to two opposite surfaces of a non-coated portion of a negative electrode current collector having a negative electrode tab.

Example 4

A jelly roll electrode assembly was formed by the same method as in Example 1, except that in Example 1, a protective tape, which satisfied a condition in which a was 80%, specifically, a1 was 30% and b1 was 80%, was attached to two opposite surfaces of a non-coated portion of a negative electrode current collector having a negative electrode tab.

Comparative Example 1

A jelly roll electrode assembly was formed by the same method as Example 1, except that in Example 1, a protective tape, which satisfied a condition in which a was 40%, specifically, a1 was 40%, was attached to one surface of a non-coated portion of a negative electrode current collector having a negative electrode tab.

Comparative Example 2

A jelly roll electrode assembly was formed by the same method as in Example 1, except that in Example 1, a protective tape, which satisfied a condition in which a was 40%, specifically, a1 was 40% and b1 was 30%, was attached to two opposite surfaces of a non-coated portion of a negative electrode current collector having a negative electrode tab.

Comparative Example 3

A jelly roll electrode assembly was formed by the same method as in Example 1, except that in Example 1, a protective tape was not attached to two opposite surfaces of a non-coated portion of a negative electrode current collector having a negative electrode tab.

The jelly roll electrode assemblies according to Examples 1 to 4 are each configured such that the protective tape is formed to cover 50% or more of at least one surface of the non-coated portion of the negative electrode of the negative electrode current collector and formed on one surface or two opposite surfaces of the non-coated portion. Therefore, it can be ascertained that the electrode wrinkle may be eliminated, and the lifespan and efficiency of the cylindrical lithium secondary battery including the jelly roll electrode assembly may be improved.

Specifically, Example 1 is a case in which the protective tape is attached to 100% of the two opposite surfaces of the non-coated portion of the negative electrode current collector having the negative electrode tab. Example 2 is a case in which the protective tape is attached to 100% of the surface of the non-coated portion of the negative electrode current collector on which the negative electrode tab is provided.

According to the comparison between Examples 1 and 2, Example 1 has the effect of eliminating the electrode wrinkle in comparison with Comparative Examples 1 to 3, and particularly, has the excellent effect of eliminating the electrode wrinkle even in comparison with Example 2 (in which the protective tape is formed on the single surface). This is a result of forming the rigid protective tape on the two opposite surfaces of the non-coated portion.

In particular, FIG. 5 is a view illustrating the negative electrode according to Example 1 of the present application. Specifically, it can be ascertained that the protective tape is attached to the two opposite surfaces of the negative electrode non-coated portion (indicated by the dotted line) so that the condition in which a is 100% is satisfied. In this case, it can be ascertained that the negative electrode is not wrinkled, and thus there is the effect of eliminating the electrode wrinkle.

Examples 3 and 4 are cases in which the protective tape is provided on the two opposite surfaces of the non-coated portion of the negative electrode current collector having the negative electrode tab but a1 and b1 are not 100%. It can be ascertained that in Examples 3 and 4, the electrode wrinkle slightly occurs, but the electrode wrinkle is improved to the extent that there is no problem with an operation of the electrode in comparison with Example 1.

Comparative Example 1 is a case in which the protective tape is formed on 50% or less of the single surface of the negative electrode non-coated portion, and Comparative Example 2 is a case in which the protective tape is formed on 50% or less of the two opposite surfaces of the negative electrode non-coated portion. It can be ascertained that the electrode wrinkle still occurs at the time of winding the electrode assembly even though the protective tape is provided. Therefore, there may occur a problem of deterioration in performance of the lithium secondary battery and a problem with safety caused by lithium precipitation.

FIG. 6 is a view illustrating the negative electrode according to Comparative Example 1 of the present application. Specifically, it can be ascertained that the protective tape is attached to one surface of the negative electrode non-coated portion (indicated by the thin dotted line) so that the condition in which a is 40% is satisfied, and 60% of the negative electrode non-coated portion is exposed. In this case, as can be seen in FIGS. 6 and 7, it can be ascertained that a length of the protective tape cannot be satisfied, and the negative electrode non-coated portion is wrinkled (enlarged as indicated by the thick dotted line). Therefore, it can be ascertained that the entire negative electrode is wrinkled, which causes deterioration in performance of the lithium secondary battery.

Comparative Example 3 is a case in which the protective tape is not provided on the two opposite surfaces. In this case, a large number of wrinkles occur during the process of winding the electrode assembly, which may cause early deterioration in performance of the lithium secondary battery and a problem with safety caused by lithium precipitation.

The invention claimed is:

1. An electrode configured to be wound into a jelly roll shape, the electrode comprising:

an electrode including an electrode current collector having a first surface and a second surface opposite the first surface, the first surface including a first electrode coated portion onto which an electrode active material is applied and a first electrode non-coated portion onto which the electrode active material is not applied, the second surface including a second electrode coated portion onto which the electrode active material is applied and a second electrode non-coated portion onto which the electrode active material is not applied, the first and second electrode non-coated portions extending from a first terminal end of the electrode in a longitudinal direction of the electrode;

an electrode tab disposed on the first electrode non-coated portion;

a first protective tape disposed on the first electrode non-coated portion and at least partially overlying the electrode tab in the longitudinal direction, the first protective tape being spaced from the first electrode coated portion such that a region of the first electrode non-coated portion is exposed between the first protective tape and the first electrode coated portion; and a second protective tape disposed on the second electrode non-coated portion and at least partially overlying the electrode tab, the second protective tape being spaced from the second electrode coated portion such that a region of the second electrode non-coated portion is exposed between the second protective tape and the second electrode coated portion, wherein the first and second protective tapes satisfy Equations 1 and 2 below:

$$25\% \leq a1 \leq 80\%, \quad \text{[Equation 1]}$$

$$25\% \leq b1 \leq 80\%, \quad \text{[Equation 2]}$$

in Equation 1 and 2, a1 is (a length of the first protective tape in the longitudinal direction/a length of the first electrode non-coated portion in the longitudinal direction)×100%, b1 is (a length of the second protective tape in the longitudinal direction/a length of the second electrode non-coated portion in the longitudinal direction)×100%, and wherein at least one of a1 or b1 is 50% or more.

2. The electrode of claim 1, wherein the electrode is a negative electrode.

3. The electrode of claim 1, wherein the first protective tape extends from the first terminal end of the electrode.

4. The electrode of claim 1, wherein the first protective tape overlies an entirety of a width of the electrode tab in the longitudinal direction of the electrode.

5. The electrode of claim 1, wherein the second protective tape overlies an entirety of a width of the electrode tab in the longitudinal direction of the electrode.

6. The electrode of claim 1, wherein the electrode current collector further includes a third electrode non-coated portion extending from a second terminal end of the electrode opposite from the first terminal end in the longitudinal direction of the electrode.

7. The electrode of claim 1, wherein each of the first and second protective tapes is made of any one selected from a group consisting of: polyethylene terephthalate (PET), polypropylene (PP), polyester, polycarbonate (PC), polyimide (PI), polyethylene naphthalate (PEN), polyether ether ketone (PEEK), polyarylate (PAR), polycylic olefin (PCO), polynorbornene, polyethersulphone (PES), or cycloolefin polymer (COP).

8. The electrode of claim 1, wherein a thickness of each of the first and second protective tapes is 10 μm to 100 μm.

9. A jelly roll electrode assembly, comprising:

a first electrode including a first electrode current collector;

a separator disposed on a surface of the first electrode;

a second electrode being the electrode of claim 1, the current collector of the second electrode disposed on a surface of the separator opposite to a surface thereof that adjoins the first electrode, the jelly roll electrode assembly being wound around the second electrode and defining a jelly roll hollow portion in a core part thereof, the first terminal end of the second electrode located at the jelly roll hollow portion.

10. The jelly roll electrode assembly of claim 9, wherein the first electrode is a positive electrode, and the second electrode is a negative electrode.

11. The jelly roll electrode assembly of claim 10, wherein the positive electrode current collector comprises a positive electrode coated portion on which a positive electrode active material is applied and a positive electrode non-coated portion on which the positive electrode active material is not applied, the jelly roll electrode assembly further comprising a positive electrode tab disposed on the positive electrode non-coated portion.

12. The jelly roll electrode assembly of claim 11, wherein the negative electrode tab and the positive electrode tab are the only electrode tabs extending from the negative electrode current collector and the positive electrode current collector, respectively.

13. The jelly roll electrode assembly of claim 11, wherein the positive electrode active material is applied on two opposite surfaces of the positive electrode coated portion of the positive electrode current collector.

14. The jelly roll electrode assembly of claim 11, wherein the positive electrode non-coated portion is located at a central portion of the positive electrode current collector along a longitudinal direction of the positive electrode.

15. The jelly roll electrode assembly of claim 10, wherein the jelly roll electrode assembly has a structure in which the negative electrode current collector is disposed at an outermost periphery thereof.

16. The jelly roll electrode assembly of claim 9, wherein the separator is a first separator, the jelly roll electrode assembly further comprising a second separator disposed on another surface of the first electrode opposite to the surface thereof that adjoins the first separator.

17. A cylindrical lithium secondary battery, comprising:

a battery exterior material;

the jelly roll electrode assembly according to claim 9 disposed in the battery exterior material; and an exterior cap having an electrode disposed in an opening portion of the battery exterior material.

18. An electrode configured to be wound into a jelly roll shape, the electrode comprising:

an electrode including an electrode current collector having a first surface and a second surface opposite the first surface, the first surface including a first electrode coated portion onto which an electrode active material is applied as well as a first electrode non-coated portion and a third electrode non-coated portion onto which the electrode active material is not applied, the second surface including a second electrode coated portion onto which the electrode active material is applied as well as a second electrode non-coated portion and a fourth electrode non-coated portion onto which the electrode active material is not applied, the first and second electrode non-coated portions extending from a first terminal end of the electrode in a longitudinal direction of the electrode, and the third and fourth electrode non-coated portions extending from a second terminal end of the electrode opposite from the first terminal end in the longitudinal direction of the electrode;

an electrode tab disposed on the first electrode non-coated portion;

a first protective tape disposed on the first electrode non-coated portion and at least partially overlying the electrode tab in the longitudinal direction, the first protective tape being spaced from the first electrode coated portion such that a region of the first electrode non-coated portion is exposed between the first protective tape and the first electrode coated portion; and a second protective tape disposed on the second electrode non-coated portion and at least partially overlying the electrode tab, the second protective tape being spaced from the second electrode coated portion such that a region of the second electrode non-coated portion is exposed between the second protective tape and the second electrode coated portion, wherein the first and second protective tapes satisfy Equations 1 and 2 below:

$$25\% \leq a1 \leq 100\%, \quad \text{[Equation 1]}$$

$$25\% \leq b1 \leq 100\%, \quad \text{[Equation 2]}$$

in Equation 1 and 2, a1 is (a length of the first protective tape in the longitudinal direction/a length of the first electrode non-coated portion in the longitudinal direction)×100%, b1 is (a length of the second protective tape in the longitudinal direction/a length of the second electrode non-coated portion in the longitudinal direction)×100%, wherein at least one of a1 or b1 is 50% or more, and wherein neither the third electrode non-coated portion nor the fourth electrode non-coated portion includes any protective tape disposed thereon.

19. The jelly roll electrode assembly of claim 18, wherein the first and second protective tapes satisfy Equations 3 and 4 below:

$$30\% \leq a1 \leq 80\%, \quad \text{[Equation 3]}$$

$$30\% \leq a1 \leq 80\%. \quad \text{[Equation 4]}$$

20. A jelly roll electrode assembly, comprising:

a first electrode including a first electrode current collector;

a separator disposed on a surface of the first electrode;

a second electrode being the electrode of claim 18, the current collector of the second electrode disposed on a surface of the separator opposite to a surface thereof that adjoins the first electrode, the jelly roll electrode assembly being wound around the second electrode and defining a jelly roll hollow portion in a core part thereof, the first terminal end of the second electrode located at the jelly roll hollow portion, wherein there is no electrode tab disposed on either the third electrode non-coated portion or the fourth electrode non-coated portion.

* * * * *